US012654115B2

(12) United States Patent
Banju et al.

(10) Patent No.: US 12,654,115 B2
(45) Date of Patent: Jun. 16, 2026

(54) FILTER

(71) Applicant: Murata Manufacturing Co., Ltd.,
Nagaokakyo (JP)

(72) Inventors: Masaru Banju, Nagaokakyo (JP);
Takashi Kondo, Nagaokakyo (JP)

(73) Assignee: **MURATA MANUFACTURING CO.,
LTD.**, Nagaokakyo (JP)

( * ) Notice: Subject to any disclaimer, the term of this
patent is extended or adjusted under 35
U.S.C. 154(b) by 568 days.

(21) Appl. No.: 18/334,772

(22) Filed: Jun. 14, 2023

(65) Prior Publication Data

US 2023/0321564 A1 Oct. 12, 2023

Related U.S. Application Data

(63) Continuation of application No.
PCT/JP2022/046220, filed on Dec. 15, 2022.

(30) Foreign Application Priority Data

Dec. 28, 2021 (JP) ................................. 2021-214998

(51) Int. Cl.
B01D 29/05 (2006.01)
B01D 39/10 (2006.01)
(52) U.S. Cl.
CPC ............. B01D 29/05 (2013.01); B01D 39/10
(2013.01)
(58) Field of Classification Search
CPC .... B01D 39/10; B01D 39/1692; B01D 39/12;
B01D 39/14; B01D 39/20; B01D
39/2027; B01D 39/16; B01D 61/18;
B01D 63/081; B01D 63/08; B01D
63/087; B01D 46/0002; B01D 69/106;
B01D 69/107; B01D 69/00; B01D 69/02;
B01D 69/06; B01D 69/10; B01D 69/12;
B01D 25/22; B01D 67/00; B01D
67/0002; B01D 67/002;
(Continued)

(56) References Cited

U.S. PATENT DOCUMENTS

2004/0060867 A1* 4/2004 Kriksunov ......... B01D 67/0069
210/488
2019/0120735 A1* 4/2019 Kinuta ................. G01N 1/4077
(Continued)

FOREIGN PATENT DOCUMENTS

JP 2008199994 A 9/2008
JP 2011147872 A 8/2011
(Continued)

OTHER PUBLICATIONS

International Search Report in PCT/JP2022/046220, mailed Feb.
14, 2023, 3 pages.

*Primary Examiner* — Allison G Fitzsimmons
(74) *Attorney, Agent, or Firm* — ArentFox Schiff LLP

(57) ABSTRACT

A filter that includes: a filter base portion that has a first main
surface and a second main surface opposite from the first
main surface and that defines a plurality of through-holes
extending between the first main surface and the second
main surface; and a first protrusion and a second protrusion
between a first set of two adjacent through-holes of the
plurality of through-holes, the first protrusion and the second
protrusion being elastically deformable, and the first protru-
sion and the second protrusion defining a first gap through
which the first set of two adjacent through-holes communi-
cate with each other.

16 Claims, 9 Drawing Sheets

(58) Field of Classification Search
CPC ............ B01D 67/0023; B01D 67/0079; B01D
67/0081; B01D 2325/02; B01D 2325/06;
B01D 29/01; B01D 29/663; C12M 33/14;
C12M 47/04; C12M 29/04
See application file for complete search history.

(56) References Cited

U.S. PATENT DOCUMENTS

| | | |
|---|---|---|
| 2021/0077925 A1 | 3/2021 | Yokota et al. |
| 2021/0146309 A1 | 5/2021 | Banju et al. |

FOREIGN PATENT DOCUMENTS

| | | |
|---|---|---|
| JP | 2015188323 A | 11/2015 |
| JP | 2021003680 A | 1/2021 |
| WO | 2017030069 A1 | 2/2017 |
| WO | 2020039936 A1 | 2/2020 |
| WO | 2020066578 A1 | 4/2020 |

* cited by examiner

FILTER

CROSS REFERENCE TO RELATED APPLICATIONS

The present application is a continuation of International application No. PCT/JP2022/046220, filed Dec. 15, 2022, which claims priority to Japanese Patent Application No. 2021-214998, filed Dec. 28, 2021, the entire contents of each of which are incorporated herein by reference.

FIELD OF THE INVENTION

The present invention relates to a filter.

BACKGROUND OF THE INVENTION

For example, Patent Document 1 discloses a cell-trapping metal filter as a filter for trapping cells.

Patent Document 1: Japanese Unexamined Patent Application Publication No. 2015-188323

SUMMARY OF THE INVENTION

However, the filter described in Patent Document 1 has room for improvement in terms of improvement of convenience.

An object of the present invention is to provide a filter that can improve convenience.

A filter according to an aspect of the present invention includes: a filter base portion that has a first main surface and a second main surface opposite from the first main surface and that defines a plurality of through-holes extending between the first main surface and the second main surface; and a first protrusion and a second protrusion between a first set of two adjacent through-holes of the plurality of through-holes, the first protrusion and the second protrusion being elastically deformable, and the first protrusion and the second protrusion defining a first gap through which the first set of two adjacent through-holes communicate with each other.

With the present invention, it is possible to provide a filter that can improve convenience.

DETAILED DESCRIPTION OF THE PREFERRED EMBODIMENTS

Background of Present Invention

Figure 1:
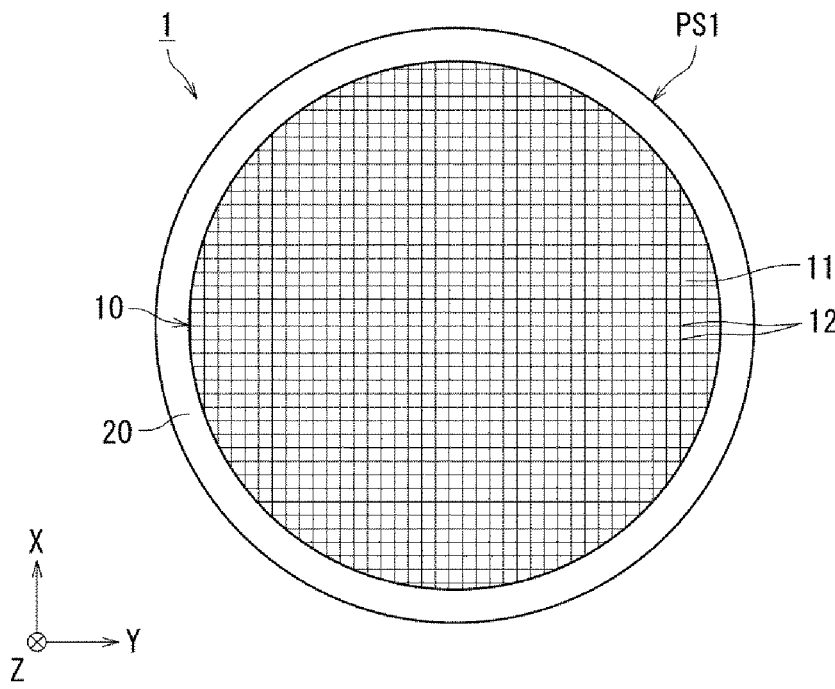
FIG. 1 is a schematic view of an example of a filter according to a first embodiment of the present invention as seen from the first main surface side.

A filter provided with a plurality of through-holes, such as a mesh member described in Patent Document 1, is known. In such a filter, the shapes and sizes of the plurality of through-holes are uniform.

In a case where filtration is performed by using a filter described in Patent Document 1, when the size of an object to be trapped by the filter changes, the filter is usually replaced with another filter. In order to replace the filter, an operation is needed to remove the filter from a filtration device and to attach a new filter to the filtration device. The operation is inconvenient for a user.

The inventors have found a configuration of a filter that enables one filter to filter out objects of different sizes and have made the following invention.

A filter according to an aspect of the present invention includes a filter base portion that has a first main surface and a second main surface opposite from the first main surface and that is provided with a plurality of through-holes through which the first main surface and the second main surface communicate with each other. The filter base portion includes a first protrusion and a second protrusion that are provided between adjacent two of the through-holes and that are elastically deformable. A gap through which the adjacent two of the through-holes communicate with each other is provided between the first protrusion and the second protrusion.

With such a configuration, it is possible to improve convenience.

The filter base portion may include a plurality of first base portions that extend in a first direction and that are disposed parallel to each other and a plurality of second base portions that extend in a second direction intersecting the first direction and that are disposed parallel to each other, the plurality of through-holes may be defined by the plurality of first base portions and the plurality of second base portions, and the first protrusion and the second protrusion may constitute a part of the plurality of first base portions.

With such a configuration, it is possible to increase the mechanical strength of the filter and to improve convenience.

The first protrusion and the second protrusion may extend in the first direction between the adjacent two of the through-holes, and an end portion of the first protrusion may face an end portion of the second protrusion.

With such a configuration, it becomes easy to adjust the size of the gap by elastic deformation of the first protrusion and the second protrusion, and it is possible to improve convenience further.

The filter base portion may include a third protrusion and a fourth protrusion that are provided between adjacent two of the through-holes, a gap through which the adjacent two of the through-holes communicate with each other may be provided between the third protrusion and the fourth protrusion, and the third protrusion and the fourth protrusion may constitute a part of the plurality of second base portions.

With such a configuration, it is possible to increase the number of portions of the filter that can elastically deform, and it is possible to improve convenience further.

The third protrusion and the fourth protrusion may be provided between one of the through-holes defined by the first protrusion and the second protrusion and an adjacent one of the through-holes.

With such a configuration, portions around the through-holes can elastically deform more easily, and it is possible to increase the opening area of the through-holes by elastic deformation.

The plurality of first base portions may be disposed at regular intervals, the plurality of second base portions may be disposed at regular intervals, and the plurality of second base portions may be perpendicular to the plurality of first base portions.

With such a configuration, it is possible to increase the mechanical strength of the filter while making elastic deformation easier, and it is possible to improve convenience.

The plurality of through-holes may each have a square shape as seen from the first main surface side, and a size of the gap may be 0.25 times or less a length of one side that defines one of the through-holes on a side communicating with the gap.

With such a configuration, it becomes easy to adjust the size of the gap by elastic deformation of the first protrusion and the second protrusion.

The plurality of through-holes may each have a circular shape as seen from the first main surface side, and a size of the gap may be 0.25 times or less a diameter of one of the through-holes communicating with the gap.

With such a configuration, it becomes easy to adjust the size of the gap by elastic deformation of the first protrusion and the second protrusion.

A length of the first protrusion may be 0.8 times to 1.2 times a length of the second protrusion.

With such a configuration, elastic deformation of the first protrusion and elastic deformation of the second protrusion become approximately equivalent to each other, and it becomes easy to adjust the size of the gap.

A length of the first protrusion may be greater than a length of the second protrusion.

With such a configuration, it is possible to enable the first protrusion to elastically deform more easily than the second protrusion.

Hereafter, a first embodiment of the present invention will be described with reference to the drawings. In each drawing, each element is illustrated in an exaggerated manner for ease of description.

First Embodiment

[Overall Structure]

Figure 2:
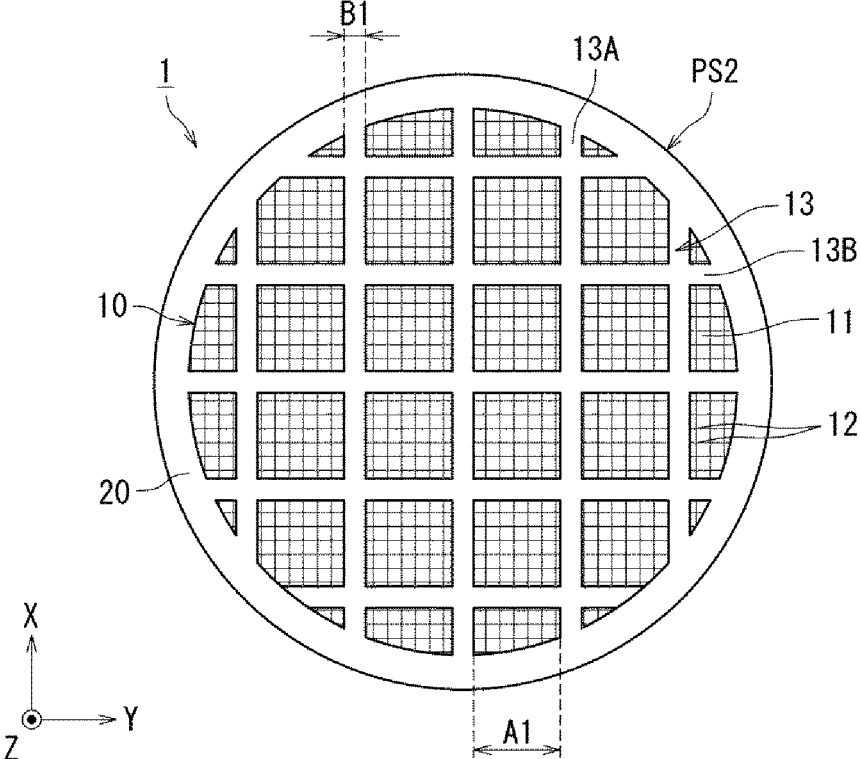
FIG. 2 is a schematic view of the example of the filter according to the first embodiment of the present invention as seen from the second main surface side.

FIG. 1 is a schematic view of an example of a filter 1 according to a first embodiment of the present invention as seen from the first main surface PS1 side. FIG. 2 is a schematic view of the example of the filter 1 according to the first embodiment of the present invention as seen from the second main surface PS2 side. In the figures, the X, Y, and Z directions respectively represent the longitudinal direction, the transversal direction, and the thickness direction of the filter 1.

For example, the filter 1 is a filter that filters a fluid including a filtration object.

In the present specification, the term "filtration object" refers to an object that is included in a fluid and that is to be filtered out. For example, a filtration object may be a biological object included in a fluid. The term "biological object" refers to an object derived from a living thing such as a cell (eukaryote), a bacterium (eubacterium), a virus, or the like. Examples of a cell (eukaryote) include an induced pluripotent stem cell (iPS cell), an ES cell, a stem cell, a mesenchymal stem cell, a mononuclear glomus cell, a single cell, a cell aggregation, a floating cell, an adhesive cell, a nerve cell, a white blood cell, a cell for regenerative medicine, a self cell, a cancer cell, a circulating tumor cell (CTC) in the blood, HL-60, HELA, and a fungus. Examples of a bacterium (eubacterium) include *Escherichia coli* and a tubercle bacillus.

Examples of a fluid include a liquid and a gas. Examples of a liquid include an electrolyte solution, a cell suspension, and a cell culture medium.

The filter 1 is a metal filter. The material of the filter 1 include, as a main component, at least one of a metal and a metal oxide. Examples of the material of the filter 1 include gold, silver, copper, platinum, nickel, palladium, titanium, an alloy of any of these, and an oxide of any of these. In particular, by using titanium or a nickel-palladium alloy, it is possible to reduce dissolution of a metal and its effect on a filtration object.

As illustrated in FIGS. 1 and 2, the filter 1 includes a filter portion 10 and a frame portion 20 provided on the outer periphery of the filter portion 10. The filter 1 has a first main surface PS1 and a second main surface PS2 opposite from the first main surface PS1. In the first embodiment, the filter portion 10 and the frame portion 20 are integrally formed.

<Filter Portion>

The filter portion 10 is a portion that filters a fluid including a filtration object. The filter portion 10 includes a filter base portion 12 that is provided with a plurality of through-holes 11 through which the first main surface PS1 and the second main surface PS2 communicate with each other. In the filter portion 10, a plurality of support portions 13 are disposed on the second main surface PS2 of the filter base portion 12.

The shape of the filter portion 10 is, for example, a circle, a polygon, or an ellipse as seen from the thickness direction of the filter 1 (the Z direction). In the first embodiment, the shape of the filter portion 10 is an approximately circular shape. In the present specification, the term "approximately circular shape" refers to a circular shape such that the ratio of the length of the long side to the length of the short side is 1.0 to 1.2.

<Frame Portion>

The frame portion 20 is a portion that is provided on the outer periphery of the filter portion 10 and in which the number of the through-holes 11 per unit area is less than that in the filter portion 10. The number of the through-holes 11 in the frame portion 20 is 1% or less the number of the through-holes 11 in the filter portion 10. The thickness of the frame portion 20 may be greater than the thickness of the filter portion 10. With such a configuration, it is possible to increase the mechanical strength of the filter 1.

In a case where the filter 1 is connected to an apparatus and used, the frame portion 20 may function as a connection portion that connects the filter 1 and the apparatus. Information about the filter 1 (such as the dimensions of the through-hole 11) may be marked on the frame portion 20.

The frame portion 20 has a ring-like shape as seen from the first main surface PS1 side of the filter portion 10. When the filter 1 is seen from the first main surface PS1 side, the center of the frame portion 20 coincides with the center of the filter portion 10. That is, the frame portion 20 is formed to be concentric with the filter 1.

Figure 3:
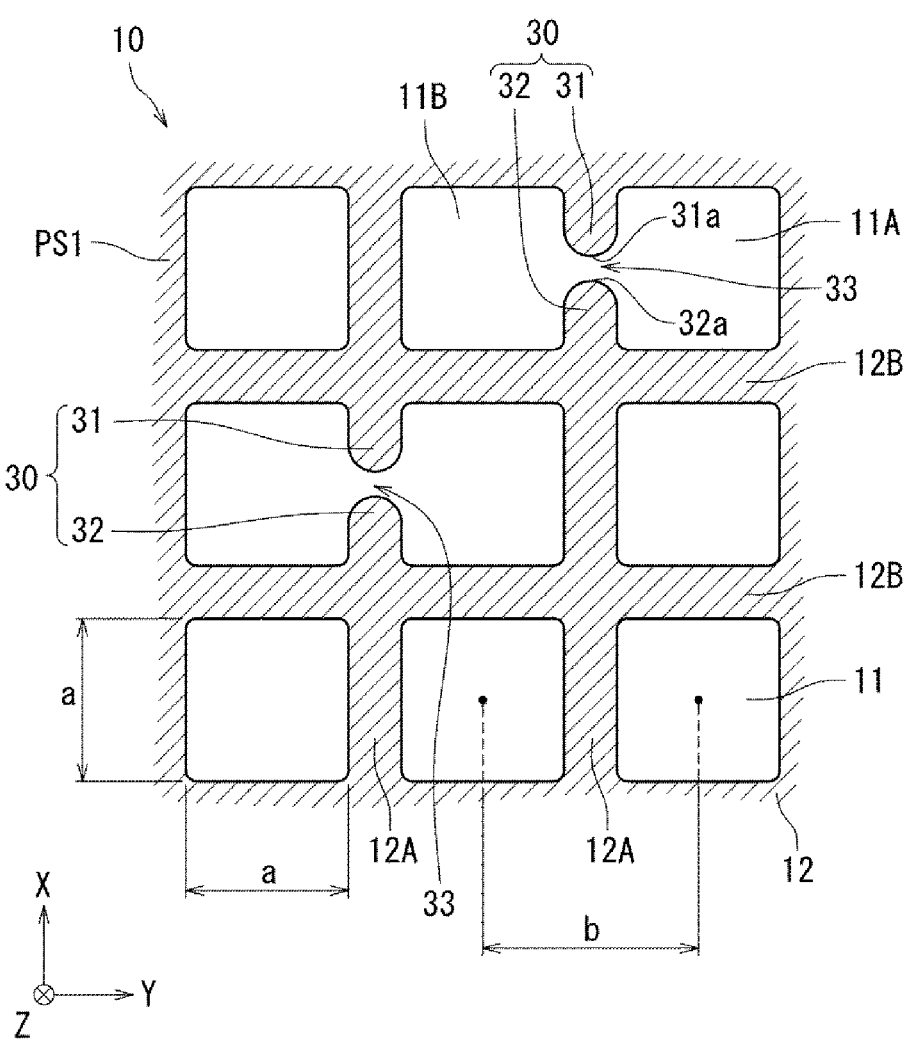
FIG. 3 is an enlarged schematic view of a part of a filter portion.

Hereafter, the filter portion 10 will be described in detail. FIG. 3 is an enlarged schematic view of a part of the filter portion 10. FIG. 3 in an enlarged view of a part of the filter base portion 12 provided with the plurality of through-holes 11, as seen from the first main surface PS1 side of the filter 1.

As illustrated in FIG. 3, the plurality of through-holes 11 are periodically disposed in the first main surface PS1 and the second main surface PS2 of the filter portion 10. To be specific, the plurality of through-holes 11 are provided in a matrix pattern at regular intervals in the filter portion 10.

In the first embodiment, the plurality of through-holes 11 are provided in two arrangement directions that are parallel to the sides of a square, that is, in the X direction and the Y direction in FIG. 3, as seen from the first main surface PS1 side of the filter portion 10 (the Z direction). In this way, by providing the plurality of through-holes 11 in a square-lattice arrangement, it is possible to increase the opening ratio, and it is possible to reduce the resistance of the filter 1 against a liquid. With such a configuration, it is possible to reduce the processing time and to reduce the stress on a filtration object. Moreover, it becomes easy to observe the filter 1 because the degree of the symmetry of the plurality of through-holes 11 is increased.

The arrangement of the plurality of through-holes 11 is not limited to a square-lattice arrangement, and may be, for example, a quasi-periodic arrangement or a periodic arrangement. Examples of a periodic arrangement may include, among polygonal arrangements, a rectangular arrangement such that the intervals in two arrangement directions are not equal, a triangular lattice arrangement, and a right-triangular lattice arrangement. Note that the arrangement of the through-holes 11 is not limited, as long as the plurality of through-holes 11 are formed in the filter portion 10.

The interval b between the through-holes 11 is appropriately designed in accordance with a filtration object to be filtered out. For example, if the filtration object is a cell, the interval b between the through-holes 11 is appropriately designed in accordance with the type (size, shape, property, elasticity) of the cell or the amount of the cells. Here, as illustrated in FIG. 3, the phrase "the interval b between the through-holes 11" refers to the distance between the center of any through-hole 11 and the center of an adjacent through-hole 11 when the through-holes 11 are seen from the first main surface PS1 side of the filter portion 10. In the first embodiment, the shape of each through-hole 11 is a square as seen from the first main surface PS1 side. The center of each through-hole 11 is the intersection of two diagonals.

In a case of a structure having a periodic arrangement, the interval b between the through-holes 11 is, for example, 1 time to 10 times the length a of one side of each through-hole 11, and, preferably, 3 times or less the length a of one side of the through-hole 11. Alternatively, for example, the opening ratio of the filter portion 10 is 10% or greater, and preferably, the opening ratio is 25% or greater. With such a configuration, it is possible to reduce the resistance of the filter portion 10 against a fluid. Therefore, it is possible to reduce the processing time and to reduce the stress on cells. The opening ratio is calculated by a formula "(the area occupied by the through-holes 11)/(the projected area of the first main surface PS1 when it is assumed that the through-holes 11 are not formed)".

An opening of each through-hole 11 on the first main surface PS1 side and an opening of the through-hole 11 on the second main surface PS2 side communicate with each other through a continuous wall surface. To be specific, the through-hole 11 is provided so that the opening on the first main surface PS1 side is projectable onto the opening on the second main surface PS2 side. That is, the through-hole 11 is provided so that the opening on the first main surface PS1 side overlaps the opening on the second main surface PS2 side when the filter portion 10 is seen from the second main surface PS2 side. In the first embodiment, an inner wall that defines the through-hole 11 is provided so as to be perpendicular to the first main surface PS1 and the second main surface PS2.

The shape of the through-hole 11 is a square as seen from the first main surface PS1 side, and the length a of one side of the through-hole 11 is 0.5 μm to 400 μm. Preferably, the length a of one side of the through-hole 11 is 1 μm to 30 μm.

The shape of the through-hole 11 is not limited to a square as seen from the first main surface PS1 side. For example, the shape of the through-hole 11 may be a circle, an ellipse, a rectangle, a polygon, or the like as seen from the first main surface PS1 side.

A part of the filter portion 10 in which the through-holes 11 are not formed is formed by the filter base portion 12. As illustrated in FIG. 3, the filter base portion 12 has a lattice-like shape. To be specific, the filter base portion 12 includes a plurality of first base portions 12A and a plurality of second base portions 12B. The plurality of first base portions 12A extend in a first direction and are disposed parallel to each other. The plurality of second base portions 12B extend in a second direction intersecting the first direction and are disposed parallel to each other.

The plurality of first base portions 12A and the plurality of second base portions 12B are formed of plate-shaped members. The plurality of first base portions 12A and the plurality of second base portions 12B intersect each other, thereby defining the plurality of through-holes 11. In the first embodiment, the first direction in which the plurality of first base portions 12A extend is the X direction, and the second direction in which the plurality of second base portions 12B extend is the Y direction. That is, in the first embodiment, the first direction and the second direction are perpendicular to each other. The plurality of first base portions 12A and the plurality of second base portions 12B are disposed at regular intervals.

In the first embodiment, the plurality of first base portions 12A and the plurality of second base portions 12B are integrally formed.

As illustrated in FIG. 3, the filter base portion 12 includes an elastically deformable portion 30. The elastically deformable portion 30 is a portion that elastically deforms when receiving a force having a predetermined strength or greater. The filter portion 10 is provided with a plurality of the elastically deformable portions 30.

The elastically deformable portion 30 includes a first protrusion 31 and a second protrusion 32 that are elastically deformable. The first protrusion 31 and the second protrusion 32 are each formed of a plate-shaped member. For example, the first protrusion 31 and the second protrusion 32 are each designed to have any appropriate thickness and width so as to be elastically deformable. The first protrusion 31 and the second protrusion 32 constitute a part of the plurality of first base portions 12A.

The first protrusion 31 and the second protrusion 32 are provided between adjacent two through-holes 11A and 11B. The first protrusion 31 and the second protrusion 32 extend in the first direction (the X direction) between the adjacent two through-holes 11A and 11B. In the present specification, the adjacent two through-holes 11A and 11B may be respectively referred to as a first through-hole 11A and a second through-hole 11B.

The first protrusion 31 and the second protrusion 32 protrude in the first direction (the X direction) from adjacent two of the second base portions 12B. An end portion 31$a$ of the first protrusion 31 faces an end portion 32$a$ of the second protrusion 32. The end portion 31$a$ of the first protrusion 31 refers to a free end of the first protrusion 31. The end portion 32$a$ of the second protrusion 32 refers to a free end of the second protrusion 32.

The shapes of the first protrusion 31 and the second protrusion 32 are not limited to the examples illustrated in FIG. 3. For example, the width of each of the first protrusion 31 and the second protrusion 32 may differ between the base portion thereof connected to the filter base portion 12 and the end portion thereof. The width of each of the first protrusion 31 and the second protrusion 32 may vary from the base portion toward the end portion.

A gap 33 through which the adjacent two through-holes 11A and 11B communicate with each other is provided between the first protrusion 31 and the second protrusion 32. To be specific, the gap 33 is formed between the end portion 31$a$ of the first protrusion 31 and the end portion 32$a$ of the second protrusion 32.

The size of the gap 33 is 0.25 times or less the length a of one side that defines each of the through-holes 11A and 11B on a side communicating with the gap 33. Preferably, the size of the gap 33 is 0.2 times or less the length a of one side that defines each of the through-holes 11A and 11B on a side communicating with the gap 33. More preferably, the size of the gap 33 is 0.1 times or less the length a of one side that defines each of the through-holes 11A and 11B on a side communicating with the gap 33. The size of the gap 33 refers to the size of the gap 33 in the direction in which the first protrusion 31 and the second protrusion 32 extend as seen from the first main surface PS1 side.

The length of the first protrusion 31 is approximately equal to the length of the second protrusion 32. For example, the length of the first protrusion 31 is 0.8 times to 1.2 times the length of the second protrusion 32. Preferably, the length of the first protrusion 31 is 0.9 times to 1.1 times the length of the second protrusion 32. The length of the first protrusion 31 and the length of the second protrusion 32 refer to the dimensions thereof in the first direction (the X direction).

Preferably, the thickness of the first protrusion 31 and the thickness of the second protrusion 32 are each smaller than the size of the through-hole 11, that is, the length a of one side of the through-hole. With such a configuration, it becomes easier for the first protrusion 31 and the second protrusion 32 to elastically deform. The thickness of the first protrusion 31 and the thickness of the second protrusion 32 each refer to the dimension thereof in the thickness direction of the filter 1 (the Z direction).

The filter portion 10 is provided with a plurality of the first protrusions 31 and a plurality of the second protrusions 32. For example, the plurality of first protrusions 31 and the plurality of second protrusions 32 are provided so as to be dispersed in the filter portion 10.

The thickness of the filter base portion 12 in the filter portion 10 is 0.5 μm to 20 μm. Thus, it is possible to provide mechanical strength and to reduce the pressure loss of a fluid that passes through the filter 1. Preferably, the thickness of the filter base portion 12 in the filter portion 10 is 1.0 μm to 3 μm. Thus, it is possible to further reduce the pressure loss of a fluid that passes through the filter 1.

In the first embodiment, the thickness of the filter base portion 12 is approximately uniform. By making the thickness of the filter base portion 12 approximately uniform, it is possible to control the position and the deflection amount of a curved portion with high reproducibility. The phrase "approximately uniform" refers a condition such that the thickness of the filter base portion 12 is within an error of ±5%. Note that the thickness of the filter base portion 12 need not be approximately uniform.

In the filter portion 10, preferably, the surface roughness of each of the first main surface PS1 and the second main surface PS2 is small. Here, the term "surface roughness" refers to the average value of the differences between the maximum values and the minimum values that are measured at arbitrary five positions by using a stylus profilometer. In the first embodiment, preferably, the surface roughness is smaller than the size of a filtration object, and more preferably, smaller than a half of the size of a filtration object. This is because it is possible to reduce adherence of a filtration object and to recover the filtration object with high efficiency after trapping the filtration object with the filter 1.

[Operation]

Figure 4A:
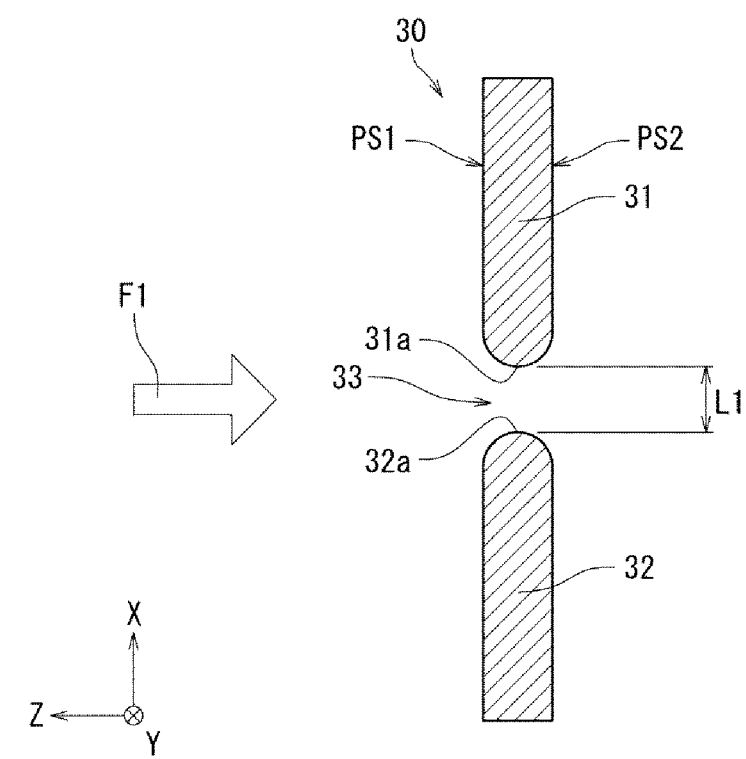
FIG. 4A is a schematic view illustrating the working of an elastically deformable portion.
Figure 4B:
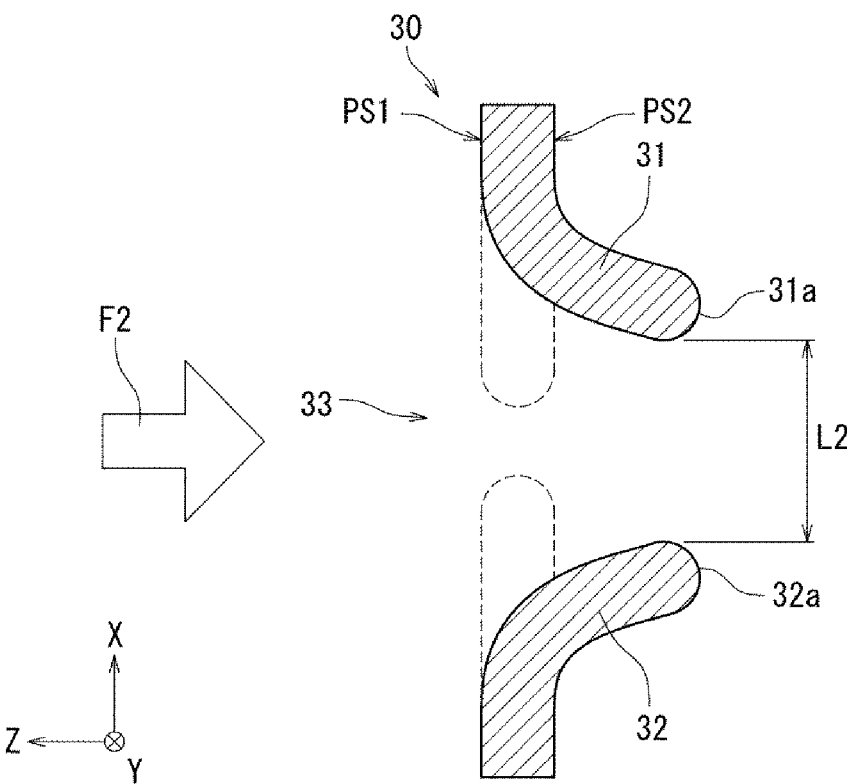
FIG. 4B is a schematic view illustrating the working of the elastically deformable portion.

Referring to FIGS. 4A and 4B, an example of the operation of the filter 1 will be described. FIGS. 4A and 4B are schematic views illustrating the operation of the elastically deformable portion 30. In FIG. 4A and FIG. 4B, the symbols "F1" and "F2" indicate a first pressure and a second pressure with which a fluid is supplied. The second pressure F2 is higher than the first pressure F1.

As illustrated in FIG. 4A, the fluid is passed through the filter 1 with the first pressure F1. The first pressure F1 is lower than a pressure with which the elastically deformable portion 30 elastically deforms. Therefore, the elastically deformable portion 30 does not elastically deform. That is, in a state in which the first pressure F1 is applied to the filter 1, the first protrusion 31 and the second protrusion 32 of the elastically deformable portion 30 are maintained in a state of extending in the first direction (the X direction).

Accordingly, in the state in which the first pressure F1 is applied to the elastically deformable portion 30, the size of the gap 33 is a first size L1 that is the minimum. Therefore, the first through-hole 11A and the second through-hole 11B that are adjacent to each other are in a state of being substantially separated from each other by the elastically deformable portion 30. The phrase "state of being substantially separated" refers to a state in which, although the first through-hole 11A and the second through-hole 11B are connected to each other via the gap 33, a filtration object to be trapped by the first through-hole 11A and the second through-hole 11B cannot pass through the gap 33. Thus, in the filter 1, a filtration object larger than the first through-hole 11A and the second through-hole 11B cannot pass through the filter 1 and is trapped on the first main surface PS1 of the filter 1.

As illustrated in FIG. 4B, the fluid is passed through the filter 1 with the second pressure F2 higher than the first pressure F1. The second pressure F2 is higher than a pressure with which the elastically deformable portion 30 elastically deforms. Therefore, the elastically deformable portion 30 elastically deforms by receiving the second pressure F2. That is, in a state in which the second pressure F2 is applied to the filter 1, the first protrusion 31 and the second protrusion 32 of the elastically deformable portion 30 deform in the flow direction of the fluid.

To be specific, the end portion 31a of the first protrusion 31 and the end portion 32a of the second protrusion 32 move in the flow direction of the fluid. An end portion of the first protrusion 31 opposite from the end portion 31a and an end portion of the second protrusion 32 opposite from the end portion 32a are each a fixed end connected to a second base portion 12B. Therefore, the first protrusion 31 and the second protrusion 32 elastically deform so as to bend in the flow direction of the fluid. In other words, the first protrusion 31 and the second protrusion 32 are cantilever-supported by two adjacent second base portions 12B.

When the first protrusion 31 and the second protrusion 32 elastically deform, the size of the gap 33 increases from the first size L1 to the second size L2. Therefore, the first through-hole 11A and the second through-hole 11B that are adjacent to each other are released from the state of being substantially separated from each other by the elastically deformable portion 30, and the first through-hole 11A and the second through-hole 11B that are adjacent to each other enter into a state of being substantially connected to each other. The phrase "state of being substantially connected to each other" refers to a state in which most of the first through-hole 11A and most of the second through-hole 11B are connected to each other through the gap 33 and a filtration object larger than the size of the first through-hole 11A and the second through-hole 11B can pass through the first through-hole 11A, the second through-hole 11B, and the gap 33. Thus, in the state in which the second pressure F2 is applied, a filtration object larger than the size of the first through-hole 11A and the second through-hole 11B can pass through the filter 1.

When the pressure applied to the elastically deformable portion 30 becomes lower than the second pressure F2, the first protrusion 31 and the second protrusion 32 move in a direction for resuming their original shapes. That is, the end portion 31a of the first protrusion 31 and the end portion 32a of the second protrusion 32 move in a direction opposite to the flow direction of the fluid. Thus, the size of the gap 33 becomes smaller than the second size L2. For example, when a pressure higher than the first pressure F1 and lower than the second pressure F2 is applied to the elastically deformable portion 30, the size of the gap 33 becomes larger than the first size L1 and smaller than the second size L2.

In this way, by adjusting the pressure applied to the elastically deformable portion 30, it is possible to control deformation of the elastically deformable portion 30. Thus, it is possible to change the size of the gap 33 and to adjust the size of a filtration object that can pass through the first through-hole 11A and the second through-hole 11B. In other words, the elastically deformable portion 30 functions as a valve that is adjustable by controlling a pressure applied thereto. As a result, with the filter 1, without replacing the filter 1, it is possible to filter out a plurality of filtration objects having different sizes by adjusting a pressure applied to the filter 1.

[Manufacturing Method]

Referring to FIGS. 5A to 5G, an example of a method of manufacturing the filter 1 will be described. FIGS. 5A to 5G each illustrate an example of a step of manufacturing the filter 1 according to the first embodiment of the present invention.

Figure 5A:
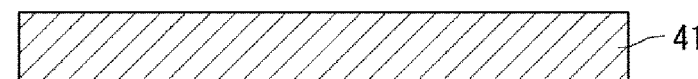
FIG. 5A illustrates an example of a step of manufacturing the filter according to the first embodiment of the present invention.

As illustrated in FIG. 5A, a substrate 41 of silicon or the like is prepared. The substrate 41 may be, for example, surface-washed.

Figure 5B:
FIG. 5B illustrates an example of a step of manufacturing the filter according to the first embodiment of the present invention.

As illustrated in FIG. 5B, a Cu film 42 is formed on the substrate 41. For example, the Cu film 42 is formed by performing sputtering by using a sputtering deposition apparatus. Alternatively, the Cu film 42 may be formed by performing vapor deposition by using a vapor deposition apparatus. At this time, in order to improve adhesion between the substrate 41 and the Cu film 42, a Ti film may be formed between the substrate 41 and the Cu film 42.

Figure 5C:
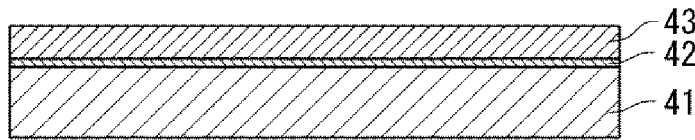
FIG. 5C illustrates an example of a step of manufacturing the filter according to the first embodiment of the present invention.

As illustrated in FIG. 5C, a resist film 43 is formed by applying a resist to the Cu film 42 and drying the resist. For example, a photosensitive positive liquid resist (Pfi-3A made by Sumitomo Chemical Co., Ltd.) is applied onto the Cu film 42 by using a spin coater. Next, the resist film 43 is formed by heating and drying the resist by using a hot plate.

Figure 5D:
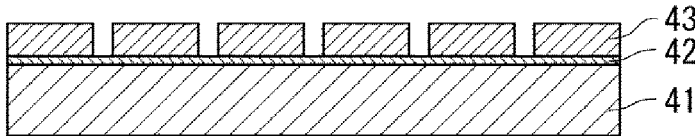
FIG. 5D illustrates an example of a step of manufacturing the filter according to the first embodiment of the present invention.

As illustrated in FIG. 5D, a portion of the resist film 43 corresponding to the filter base portion 12 is removed by performing exposure and development on the resist film 43. For example, an i-line stepper (Pfi-37A made by Canon) is used as an exposure apparatus. For example, during exposure, a mask is used to form the elastically deformable portion 30 and the gap 33. To be specific, on the portion of the resist film 43 corresponding to the filter base portion 12, a linear mask is designed at a position where the gap 33 is to be formed.

Development is performed by using a paddle development apparatus. As a development liquid, TMAH (tetramethylammonium hydroxide) is used. After performing exposure and development, washing with water and drying are performed. A resist residue is formed at the position where the linear mask is designed.

Figure 5E:
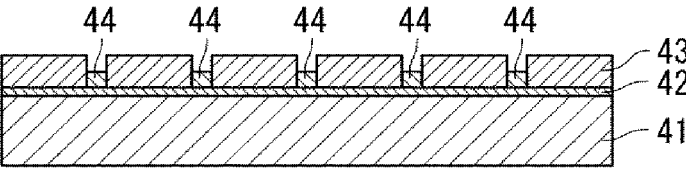
FIG. 5E illustrates an example of a step of manufacturing the filter according to the first embodiment of the present invention.

As illustrated in FIG. 5E, electrolytic plating is performed by using an electrolytic plating apparatus. Thus, a plating film 44 is formed in a part from which the resist film 43 has been removed. As described above, at the position corresponding to the filter base portion 12, the resist residue has been formed at the position where the mask is designed. When electrolytic plating is performed in this state, the plating film 44 is not formed at the position where the resist residue is formed. Thus, it is possible to form the elastically deformable portion 30 and the gap 33. As the thickness of the resist residue decreases, it becomes more likely that the thicknesses of the first protrusion 31 and the second protrusion 32 become uniform. As the thickness of the resist residue increases, the thickness of the first protrusion and the second protrusion 32 decreases toward an end portion. The thickness of the resist residue can be adjusted by controlling the design of the mask and the conditions of exposure and development.

Figure 5F:
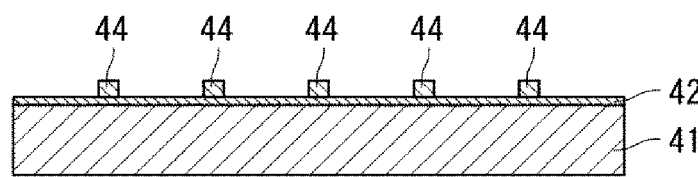
FIG. 5F illustrates an example of a step of manufacturing the filter according to the first embodiment of the present invention.

As illustrated in FIG. 5F, the resist film 43 is stripped off with a stripping liquid NMP (N-methyl-2-pyrrolidone) by using a resist stripping apparatus that can perform high-pressure spraying. Subsequently, the plating film 44 is washed with IPA (isopropyl alcohol), washed with water, and dried.

Figure 5G:
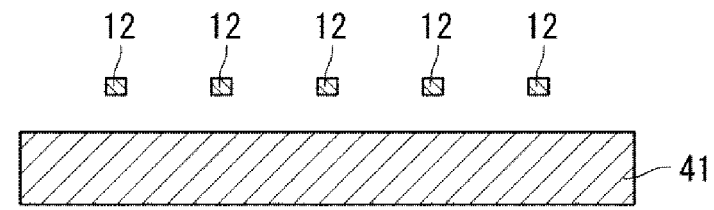
FIG. 5G illustrates an example of a step of manufacturing the filter according to the first embodiment of the present invention.

As illustrated in FIG. 5G, aqueous acetic acid hydrogen peroxide is prepared as an etching liquid, and the Cu film 42 is etched away by performing immersion treatment while stirring the etching liquid by using a stirrer. Thus, the filter base portion 12 is formed by removing the plating film 44 from the substrate 41.

In this way, the filter 1 can be manufactured.

Advantageous Effects

The filter 1 according to the first embodiment produces the following advantageous effects.

The filter 1 includes the filter base portion 12 that has the first main surface PS1 and the second main surface PS2 opposite from the first main surface PS1 and that is provided with the plurality of through-holes 11 through which the first main surface PS1 and the second main surface PS2 communicate with each other. The filter base portion 12 includes the first protrusion 31 and the second protrusion 32 that are provided between the adjacent two through-holes 11A and 11B and that are elastically deformable. The gap 33 through which the adjacent two through-holes 11A and 11B communicate with each other is provided between the first protrusion 31 and the second protrusion 32.

With such a configuration, it is possible to improve the convenience of the filter 1. When filtration is performed by using the filter 1, it is possible to adjust the size of a filtration object that can pass through the filter 1 by adjusting the pressure applied to the filter 1.

For example, when a fluid is filtered in a state in which a pressure with which the first protrusion 31 and the second protrusion 32 do not elastically deform is applied to the filter 1, the first protrusion 31 and the second protrusion 32 do not elastically deform and are positioned between the adjacent two through-holes 11A and 11B. Therefore, a filtration object larger than the adjacent two through-holes 11A and 11B cannot pass through the through-holes 11A and 11B of the filter 1 and is trapped on the first main surface PS1.

When a fluid is filtered in a state in which a pressure with which the first protrusion 31 and the second protrusion 32 elastically deform is applied to the filter 1, the first protrusion 31 and the second protrusion 32 elastically deform in the flow direction of a fluid. Thus, the gap 33 becomes larger, and a region in which the adjacent two through-holes 11A and 11B communicate with each other becomes larger. That is, the opening area of a portion where the adjacent two through-holes 11A and 11B are formed increases. As a result, a filtration object larger than the adjacent two through-holes 11A and 11B can pass through of the filter 1 through the through-holes 11A and 11B and the gap 33.

In this way, by applying a pressure to the filter 1, it is possible to elastically deform the first protrusion 31 and the second protrusion 32 that separate the adjacent two through-holes 11A and 11B. Moreover, by adjusting the pressure applied to the filter 1, it is possible to adjust the size of the gap 33 formed between the first protrusion 31 and the second protrusion 32. Thus, it is possible to adjust a region in which the adjacent two through-holes 11A and 11B communicate with each other as seen from the first main surface PS1 side by using the gap 33 and to select the size of a filtration object to be trapped. As a result, it is possible to perform filtering in accordance with the size of a filtration object to be trapped without replacing the filter, and therefore it is possible to improve the convenience of the filter 1.

When filtration of a fluid is performed in a state in which the first protrusion 31 and the second protrusion 32 are not elastically deformed, it is possible to suppress clogging with a filtration object because the fluid flows into the gap 33. That is, it is possible to improve the passing ability of the filter 1 by using the gap 33.

When the pressure applied to the filter 1 is reduced during filtration, the first protrusion 31 and the second protrusion 32 return in a direction opposite to the flow direction of the fluid due to an elastic force. At this time, a turbulent flow is generated in the vicinity of the filter 1 because the first protrusion 31 and the second protrusion 32 move against the force of the flowing fluid. Due to the turbulent flow, it is possible to remove a filtration object trapped on the first main surface PS1 of the filter 1 in a direction away from the first main surface PS1. Thus, it is possible to suppress clogging with a filtration object.

During the time when the first protrusion 31 and the second protrusion 32 elastically deform in the flow direction of the fluid, the opening area of the adjacent through-holes 11A and 11B and the gap 33 increases, and therefore it becomes easier for the fluid to flow into the through-holes 11A and 11B and the gap 33. Therefore, it becomes easier for a pressure generated by the fluid to be concentrated on the vicinity of the adjacent through-holes 11A and 11B and the gap 33. Thus, it is possible to relieve a pressure applied to the filter 1 from the adjacent through-holes 11A and 11B and the gap 33 and to suppress breakage of the filter 1.

The filter base portion 12 includes the plurality of first base portions 12A and the plurality of second base portions 12B. The plurality of first base portions 12A extend in the first direction and are disposed parallel to each other. The plurality of second base portions 12B extend in the second direction intersecting the first direction and are disposed parallel to each other. The plurality of through-holes 11 are defined by the plurality of first base portions 12A and the plurality of second base portions 12B. The first protrusion 31 and the second protrusion 32 constitute a part of the plurality of first base portions 12A. With such a configuration, it is possible to increase the mechanical strength of the filter 1 and to improve convenience.

The first protrusion 31 and the second protrusion 32 extend in the first direction between the adjacent two through-holes 11A and 11B. The end portion 31a of the first protrusion 31 faces the end portion 32a of the second protrusion 32. With such a configuration, it becomes easy to adjust the size of the gap 33 by elastic deformation of the first protrusion 31 and the second protrusion 32. As a result, it is possible to further improve the convenience of the filter 1.

The plurality of first base portions 12A are disposed at regular intervals. The plurality of second base portions 12B are disposed at regular intervals. The plurality of second base portions 12B are perpendicular to the plurality of first base portions 12A. With such a configuration, it is possible to form the filter base portion 12 having a lattice-like shape and to improve the filtering efficiency of the filter 1.

The plurality of through-holes 11 each have a square shape as seen from the first main surface PS1 side. The size of the gap 33 is 0.25 times or less the length a of one side that defines each of the through-holes 11A and 11B on a side communicating with the gap 33. With such a configuration, it is possible to easily adjust the size of a filtration object to be trapped. For example, it is possible to prevent passage of a filtration object lager than the through-holes 11A and 11B when the first protrusion 31 and the second protrusion 32 are not elastically deformed, and it is possible to allow passage of a filtration object lager than the through-holes 11A and 11B when the first protrusion 31 and the second protrusion 32 are elastically deformed.

The length of the first protrusion 31 is 0.8 times to 1.2 times the length of the second protrusion 32. With such a configuration, elastic deformation of the first protrusion 31 and elastic deformation of the second protrusion 32 become the same easily. Thus, it becomes easy to adjust the size of the gap 33.

In the first embodiment, an example in which the filter 1 includes the frame portion 20 has been described. However, this is not a limitation. For example, the filter 1 need not include the frame portion 20.

In the first embodiment, an example in which the length of the first protrusion 31 and the length of the second protrusion 32 are approximately equal has been described. However, this is not a limitation. For example, the length of the first protrusion 31 and the length of the second protrusion 32 may differ from each other.

In the first embodiment, an example in which the first protrusion 31 and the second protrusion 32 constitute a part of the first base portion 12A has been described. However, this is not a limitation. For example, the first protrusion 31 and the second protrusion 32 may constitute a part of the second base portion 12B.

Hereafter, modifications will be described.

First Modification

Figure 6:
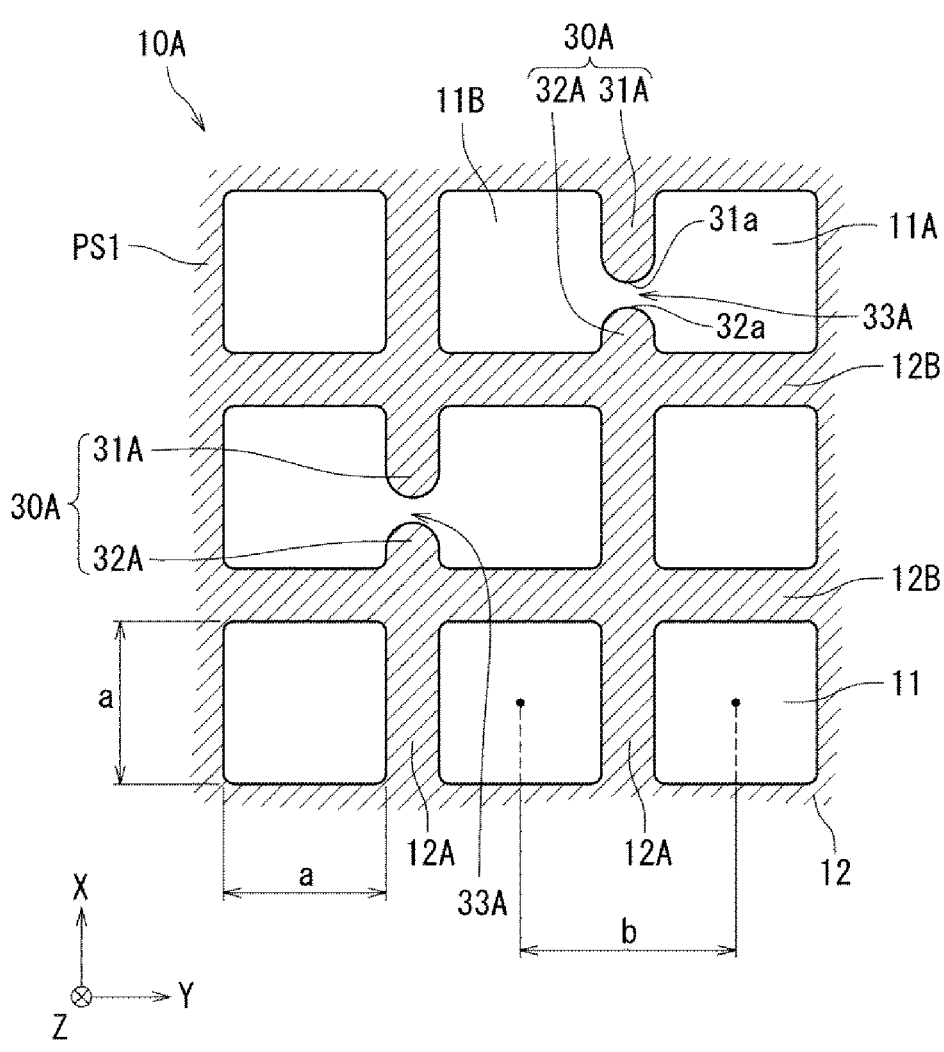
FIG. 6 is an enlarged schematic view of a part of a filter portion according to a first modification.

FIG. 6 is an enlarged schematic view of a part of a filter portion 10A according to a first modification. As illustrated in FIG. 6, in an elastically deformable portion 30A according to the first modification, the length of a first protrusion 31A and the length of a second protrusion 32A may differ from each other. In the first modification, the length of the first protrusion 31A is greater than the length of the second protrusion 32A. With such a configuration, the first protrusion 31A elastically deforms more easily than the second protrusion 32A.

Figures 7A, 7B:
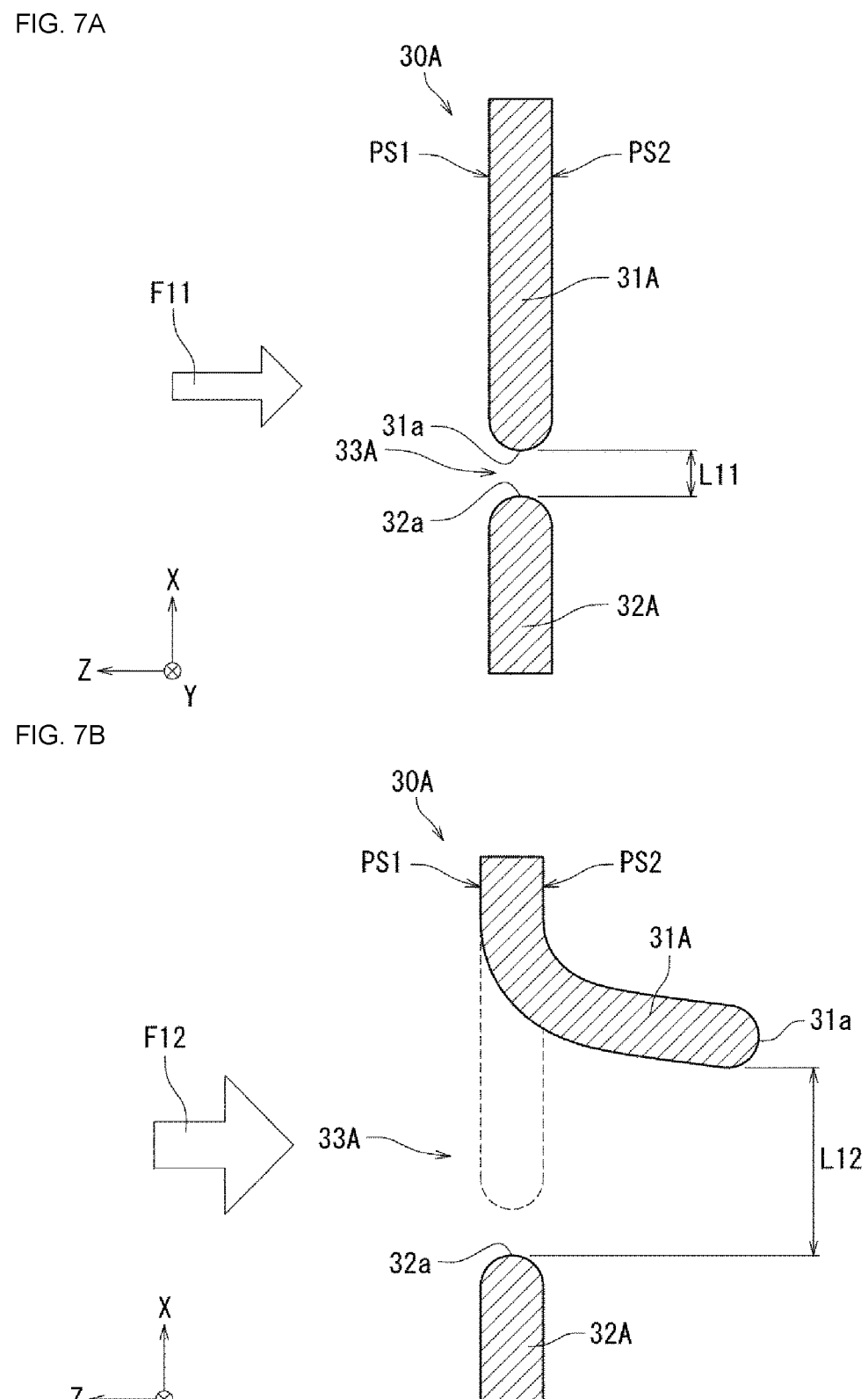
FIG. 7A is a schematic view illustrating the working of an elastically deformable portion according to the first modification.
FIG. 7B is a schematic view illustrating the working of the elastically deformable portion according to the first modification.
Figure 7C:
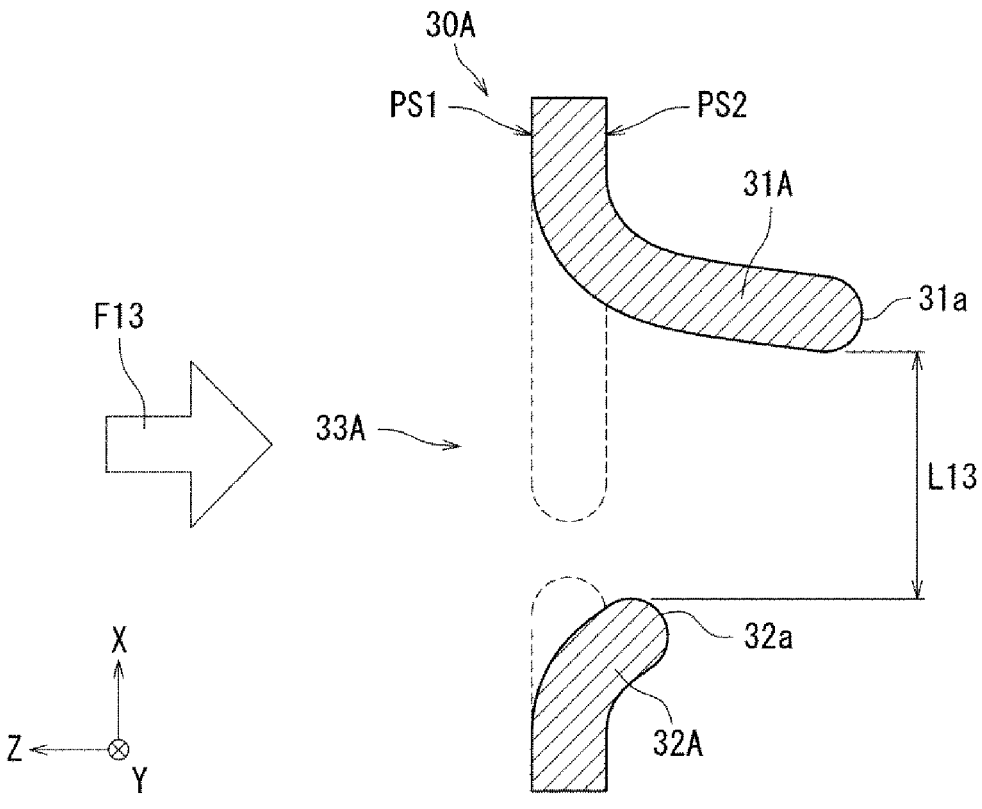
FIG. 7C is a schematic view illustrating the working of the elastically deformable portion according to the first modification.

FIGS. 7A to 7C are schematic views illustrating the working of the elastically deformable portion 30A according to the first modification. In FIGS. 7A to 7C, the symbols "F11", "F12", and "F13" respectively indicate a first pressure, a second pressure, and a third pressure applied to the filter 1. The magnitudes of the pressures have a relationship "F11<F12<F13".

As illustrated in FIG. 7A, in a state in which the first pressure F11 is applied, the first protrusion 31A and the second protrusion 32A do not elastically deform. Therefore, the size of a gap 33A is a first size L11 that is the minimum.

As illustrated in FIG. 7B, in a state in which the second pressure F12 is applied, the first protrusion 31A elastically deforms while the second protrusion 32A does not elastically deform. Therefore, the size of the gap 33A is a second size L12 that is greater than the first size L11.

As illustrated in FIG. 7C, in a state in which the third pressure F13 is applied, the first protrusion 31A and the second protrusion 32A elastically deform. Therefore, the size of the gap 33A is a third size L13 that is greater than the second size L12.

In this way, it is possible to adjust the size of the gap 33 also in the case where the length of the first protrusion 31A is greater than the length of the second protrusion 32. Thus, with the first modification, it is possible to produce advantageous effects similar to those of the first embodiment.

As the length of the first protrusion 31 is increased, the first protrusion 31 tends to generate a large force against a fluid when resuming the original shape after elastically deforming. Therefore, it becomes easier to generate a turbulent flow, and it becomes easier to remove from the filter 1 a filtration object trapped on the first main surface PS1 of the filter 1.

Second Modification

Figure 8:
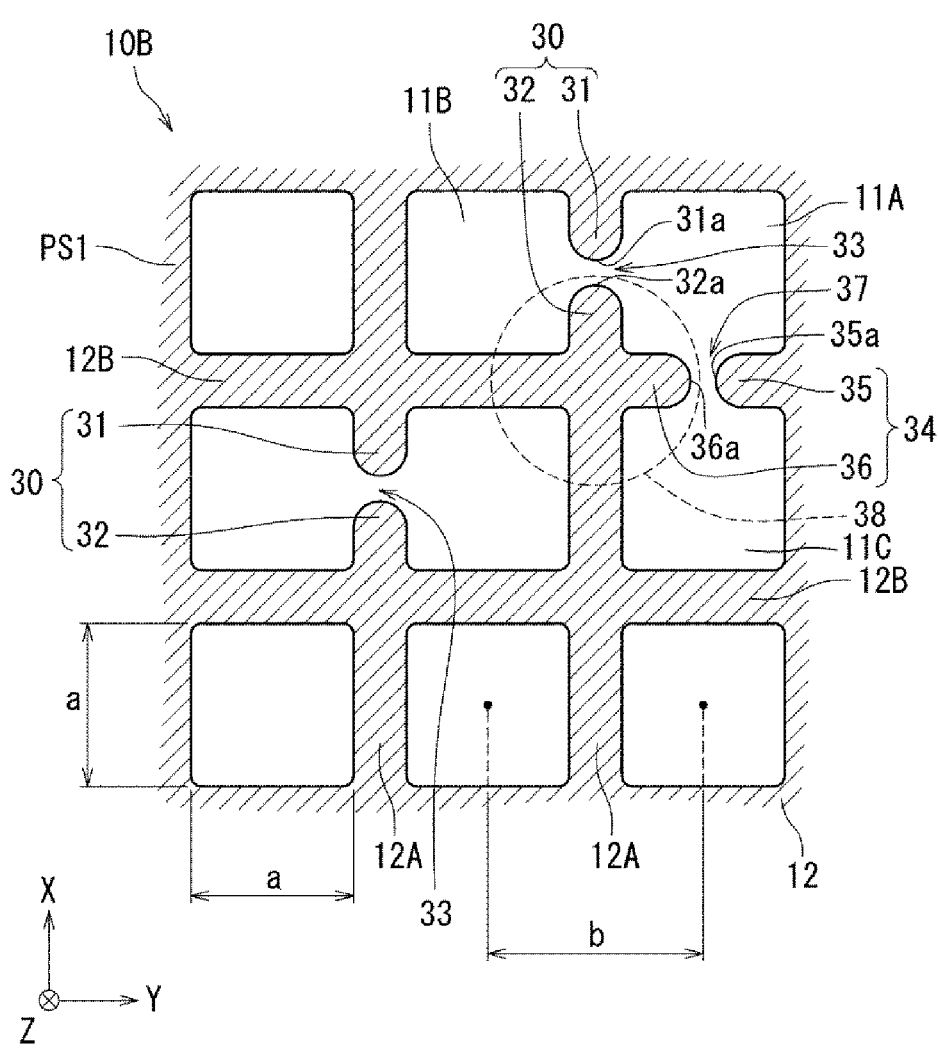
FIG. 8 is an enlarged schematic view of a part of a filter portion according to a second modification.

FIG. 8 is an enlarged schematic view of a part of a filter portion 10B according to a second modification. As illustrated in FIG. 8, in the filter portion 10B according to the second modification, the filter base portion 12 further includes an elastically deformable portion 34. The elastically deformable portion 34 is provided between adjacent two through-holes 11A and 11C.

The elastically deformable portion 34 includes a third protrusion 35 and a fourth protrusion 36 that are elastically deformable. In the second modification, the third protrusion 35 and the fourth protrusion 36 are similar to the first protrusion 31 and the second protrusion 32 described in the first embodiment.

To be specific, the third protrusion 35 and the fourth protrusion 36 are provided between the through-hole 11A defined by the first protrusion 31 and the second protrusion 32 and the adjacent through-hole 11C. The third protrusion 35 and the fourth protrusion 36 constitute a part of the plurality of second base portions 12B.

The third protrusion 35 and the fourth protrusion 36 protrude in the second direction (the Y direction) from adjacent two of the first base portions 12A. An end portion 35a of the third protrusion 35 faces an end portion 36a of the fourth protrusion 36. The end portion 35a of the third protrusion 35 refers to a free end of the third protrusion 35. The end portion 36a of the fourth protrusion 36 refers to a free end of the fourth protrusion 36.

A gap 37 through which the adjacent two through-holes 11A and 11C communicate with each other is provided between the third protrusion 35 and the fourth protrusion 36. To be specific, the gap 37 is formed between the end portion 35a of the third protrusion 35 and the end portion 36a of the fourth protrusion 36.

With such a configuration, the elastically deformable portion 34 can produce advantageous effects similar to those of the elastically deformable portion 30, and the second modification can produce advantageous effects similar to those described in the first embodiment.

In the second modification, the elastically deformable portion 30 and the elastically deformable portion 34 are provided in the vicinity of the first through-hole 11A. Therefore, a part 38 of the filter base portion 12 that defines the first through-hole 11A elastically deforms by receiving a pressure when a fluid flows. Thus, it is possible to make the opening area larger. Moreover, because the part 38 vibrates easily, a filtration object trapped by the filter 1 can be easily removed from the filter 1, and it is possible to suppress clogging.

Third Modification

Figure 9:
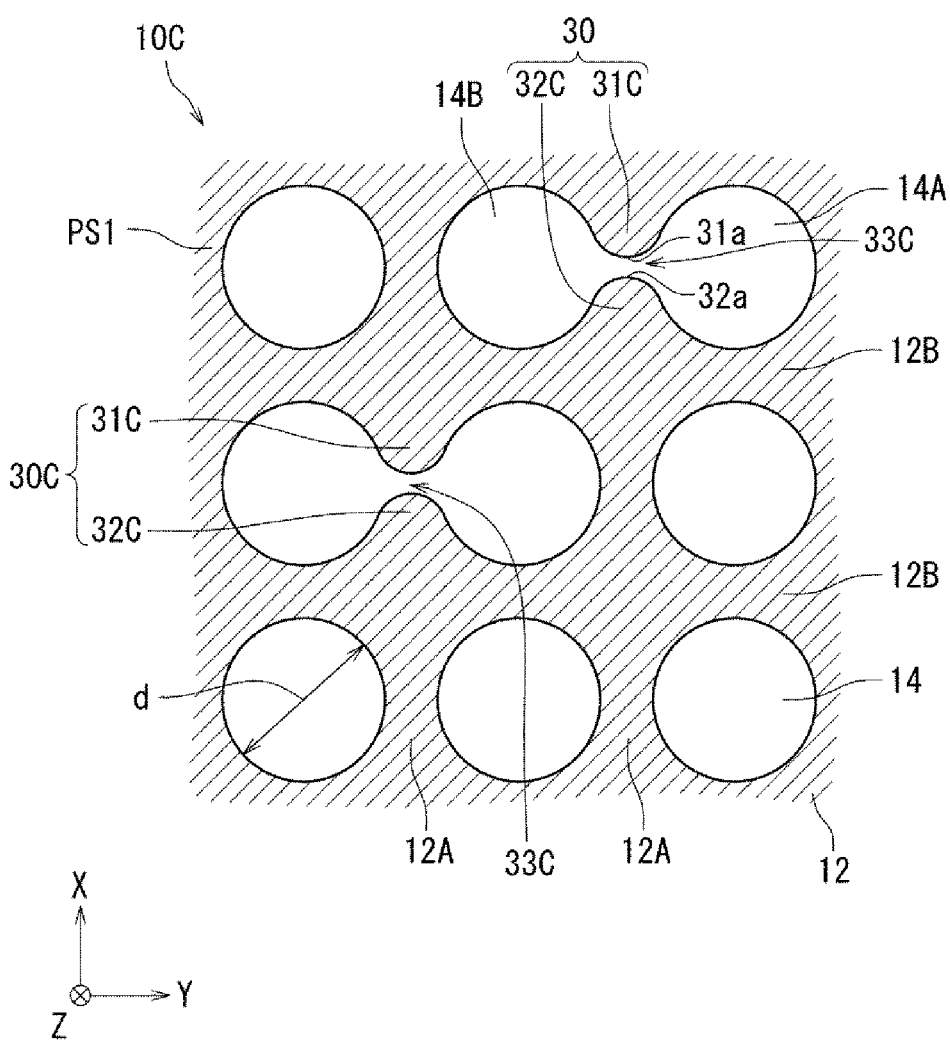
FIG. 9 is an enlarged schematic view of a part of a filter portion according to a third modification.

FIG. 9 is an enlarged schematic view of a part of a filter portion 10C according to a third modification. As illustrated in FIG. 9, in the third modification, a plurality of through-holes 14 each have a circular shape having a diameter d as seen from the first main surface PS1 side.

An elastically deformable portion 30C is provided between adjacent two through-holes 14A and 14B. A first protrusion 31C and a second protrusion 32C protrude in the first direction (the X direction) along the shapes of the through-holes 14A and 14B. A gap 33C is provided between the first protrusion 31C and the second protrusion 32C. For example, the size of the gap 33C is 0.25 times or less the diameter of each of the through-holes 14A and 14B communicating with the gap 33C.

The third modification can also produce advantageous effects similar to those described in the first embodiment.

In the present specification, terms such as "first", "second", and the like are used only for the purpose of description, and it should not be understood that these terms explicitly or implicitly represent the relative importance or the order of technological features. Features limited as "first" and "second" explicitly or implicitly indicate that they include one or more of the features.

The present invention has been sufficiently described in connection with preferred embodiments with reference to the drawings, and it is clear for persons skilled in the art that various modifications and corrections can be made. It should be understood that such modifications and corrections are included in the scope of the present invention represented by the claims as long as they are not beyond the scope.

A filter according to the present invention is applicable to the use of filtering out a filtration object in a fluid.

REFERENCE SIGNS LIST 1 filter
10, 10A, 10B, 10C filter portion
11 through-hole
11A first through-hole
11B second through-hole
11C third through-hole
12 filter base portion
12A first base portion
12B second base portion
13 support portion
13A first support portion
13B second support portion
14 through-hole
14A first through-hole
14B second through-hole
20 frame portion
30, 30A, 30B, 30C elastically deformable portion
31, 31A, 31C first protrusion
31$a$ end portion
32, 32A, 32C second protrusion
32$a$ end portion
33, 33A, 33C gap
34 elastically deformable portion
35 third protrusion
35$a$ end portion
36 fourth protrusion
36$a$ end portion
37 gap
38 part

The invention claimed is:

1. A filter comprising:
a filter base portion that has a first main surface and a second main surface opposite from the first main surface and that defines a plurality of through-holes extending between the first main surface and the second main surface; and a first protrusion and a second protrusion between a first set of two adjacent through-holes of the plurality of through-holes, the first protrusion and the second protrusion being elastically deformable, and the first protrusion and the second protrusion defining a first gap through which the first set of two adjacent through-holes communicate with each other.

2. The filter according to claim 1, wherein the filter base portion further includes:
a plurality of first base portions that extend in a first direction and that are disposed parallel to each other; and
a plurality of second base portions that extend in a second direction intersecting the first direction and that are disposed parallel to each other,
wherein the plurality of through-holes are defined by the plurality of first base portions and the plurality of second base portions, and
wherein the first protrusion and the second protrusion are a part of the plurality of first base portions.

3. The filter according to claim 2,
wherein the first protrusion and the second protrusion extend in the first direction between the first set of two adjacent through-holes, and
wherein an end portion of the first protrusion faces an end portion of the second protrusion.

4. The filter according to claim 3, further comprising:
a third protrusion and a fourth protrusion between a second set of two adjacent through-holes of the plurality of through-holes,
the third protrusion and the fourth protrusion defining a second gap through which the second set of two adjacent through-holes communicate with each other, and
the third protrusion and the fourth protrusion are a part of the plurality of second base portions.

5. The filter according to claim 4, wherein the third protrusion and the fourth protrusion are between one of the first set of two adjacent through-holes and one of the second set of two adjacent through-holes.

6. The filter according to claim 2, further comprising:
a third protrusion and a fourth protrusion between a second set of two adjacent through-holes of the plurality of through-holes,
the third protrusion and the fourth protrusion defining a second gap through which the second set of two adjacent through-holes communicate with each other, and
the third protrusion and the fourth protrusion are a part of the plurality of second base portions.

7. The filter according to claim 6, wherein the third protrusion and the fourth protrusion are between one of the first set of two adjacent through-holes and one of the second set of two adjacent through-holes.

8. The filter according to claim 2,
wherein the plurality of first base portions are disposed at regular intervals,
wherein the plurality of second base portions are disposed at regular intervals, and
wherein the plurality of second base portions are perpendicular to the plurality of first base portions.

9. The filter according to claim 1,
wherein the plurality of through-holes each have a square shape as seen from the first main surface, and
wherein a size of the first gap is 0.25 times or less a length of one side that defines one of the first set of two adjacent through-holes.

10. The filter according to claim 9, wherein the size of the first gap is 0.2 times or less the length of the one side that defines the one of the first set of two adjacent through-holes.

11. The filter according to claim 9, wherein the size of the first gap is 0.1 times or less the length of the one side that defines the one of the first set of two adjacent through-holes.

12. The filter according to claim 1, wherein the plurality of through-holes each have a circular shape as seen from the first main surface, and wherein a size of the first gap is 0.25 times or less a diameter of one of the first set of two adjacent through-holes.

13. The filter according to claim 12, wherein the size of the first gap is 0.2 times or less the diameter of the one of the first set of two adjacent through-holes.

14. The filter according to claim 12, wherein the size of the first gap is 0.1 times or less the diameter of the one of the first set of two adjacent through-holes.

15. The filter according to claim 1, wherein a length of the first protrusion is 0.8 times to 1.2 times a length of the second protrusion.

16. The filter according to claim 1, wherein a length of the first protrusion is greater than a length of the second protrusion.

* * * * *

18